UNITED STATES PATENT OFFICE.

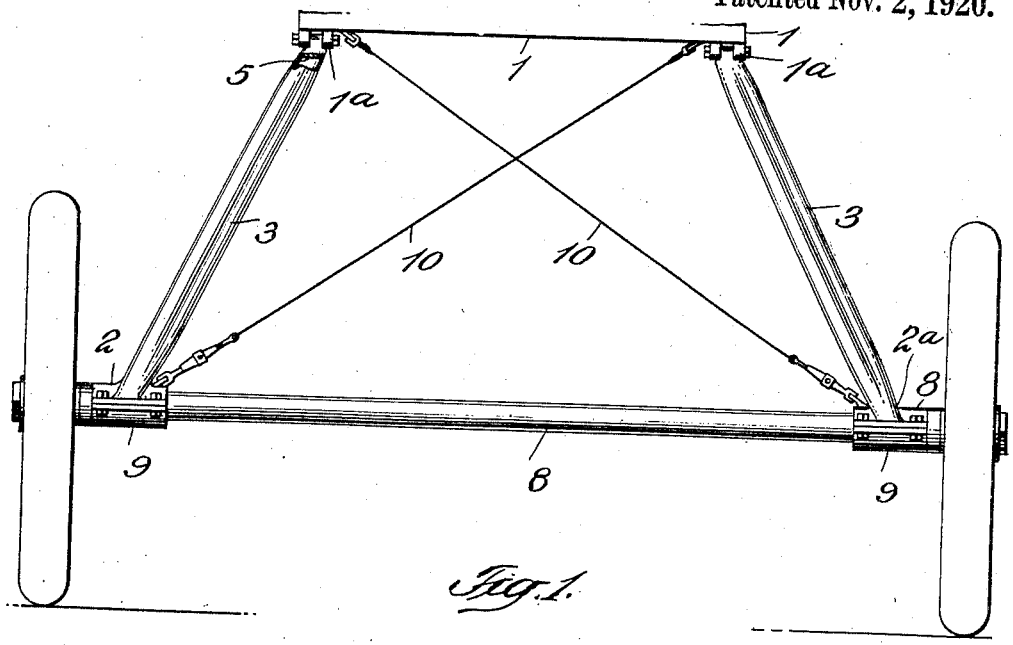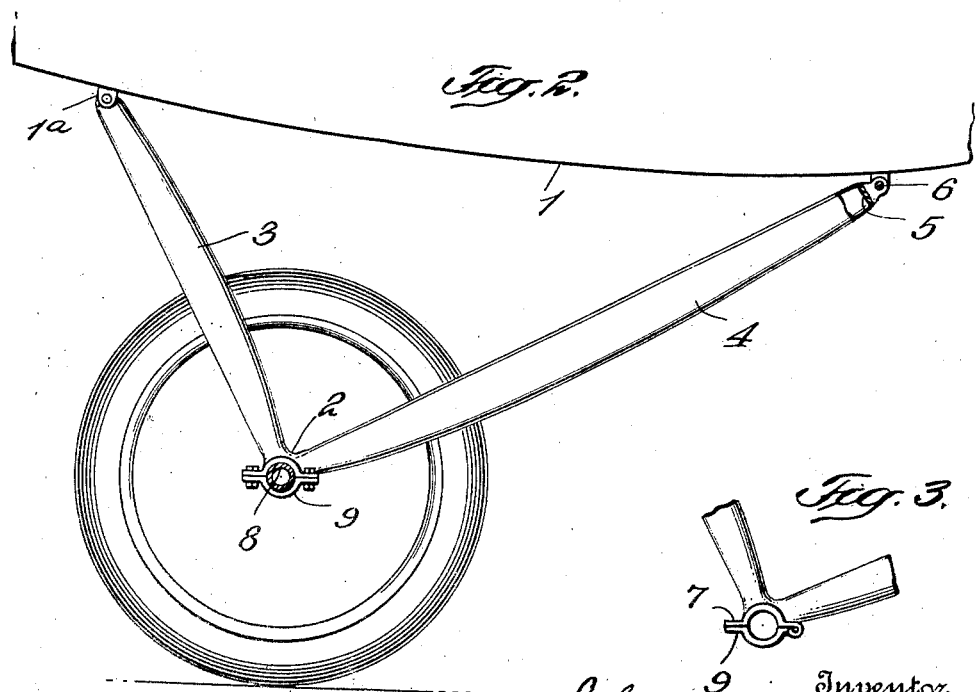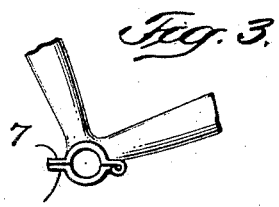

JOHN W. RAPP, OF COLLEGE POINT, AND JOSEPH VANORIO, OF BROOKLYN, NEW YORK; SAID VANORIO ASSIGNOR TO SAID RAPP.

RUNNING-GEAR FOR AIRPLANES.

1,357,898.  Specification of Letters Patent.  Patented Nov. 2, 1920.

Application filed January 19, 1918. Serial No. 212,781.

*To all whom it may concern:*

Be it known that we, JOHN W. RAPP and JOSEPH VANORIO, citizens of the United States, and residing at College Point and Brooklyn, in the counties of Queens and Kings, respectively, and State of New York, have invented new and Improved Running-Gears for Airplanes, of which the following specification is a full disclosure.

This invention relates to improvements in running gear for airplanes.

By the use of our invention we are enabled to produce a running gear for airplanes of metal which will meet all the requirement of lightness in weight, strength and rigidity and vibration-resistant qualities, and will also be very much more economical to manufacture and more convenient to handle. To these ends, we form the strut members of hollow metal, connect each pair of struts together at their lower ends with an integral journal plate which is permanently welded thereto so as to form a single unit, and we provide each strut at its upper end with integral pivot knuckles.

Other objects of our invention will be in part obvious from the accompanying drawings and in part indicated in connection therewith by the following analysis of our invention.

In the accompanying drawings, in which similar reference characters designate corresponding parts throughout the several views, Figure 1 is a front elevation of a running gear embodying our invention;

Fig. 2 is a side elevation of the running gear shown in Fig. 1;

Fig. 3 is a detail view of the lower end of a pair of struts showing the connection of the same together and to one of two complementary journal plates; and Fig. 4 is a horizontal section through the body portion of any one of the struts showing the hollow formation thereof.

Referring now to these drawings, 1 indicates the body or chassis of a fuselage of an airplane under which the running gear is arranged. According to our invention, this running gear comprises strut units located respectively at opposite sides of the chassis, each unit comprising a pair of struts or strut-members 3 and 4 respectively permanently connected together at their lower ends so as to form a single integral unit. Each of the members of a pair has a hollow or tubular body portion intermediate its ends, the upper end being closed by a plate 5 having integral bolt knuckles 6 adapted to be connected to knuckles 1ᵃ on the chassis of the fuselage, and the lower ends of each pair are connected together and to a common journal plate 7 integrally or permanently secured thereto by electric welding or the like. This journal plate 7 is, as shown, disposed transversely of the two members of a pair of struts and has formed therein a semi-circular bearing cavity into which the axle 8 having suitable spring wheels is adapted to seat. The axle 8 is secured in position by means of a complementary clamping plate 9 which is hinged at its rear edge to the said journal plate 7 and is connected thereto at its opposite marginal edges by bolts and nuts or the like.

Suitable tension members 10 are provided to properly reinforce the strut members in the usual manner.

Without further analysis, the foregoing will so fully reveal the gist of this invention that others can by applying current knowledge readily adapt it for various applications without omitting certain features that, from the standpoint of the prior art, might fairly constitute essential characteristics of the generic or specific aspects of the invention, and therefore such adaptations should and are intended to be comprehended within the meaning and range of equivalency of the following claims.

Having described our invention, we claim:

1. Running gear for airplanes embodying integral strut units, each comprising a pair of hollow metal struts permanently connected together at their lower ends and also permanently connected to a common journal plate having an axle seat, and each strut member having at its upper end a closing plate permanently connected thereto and provided with integral pivot knuckles.

2. Running gear for airplanes embodying integral strut units, each comprising a pair of hollow metal struts tapering toward the opposite ends thereof, stream-line in cross-section and integrally connected together at their lower ends and also integrally connected to a common journal plate having an axle seat; an axle provided with suitable spring wheels seated in said axle seat, and a complementary journal plate connected to the integral plate to retain the axle within said seat.

3. Running gear for airplanes embodying a pair of struts at opposite sides of the chassis of an aeroplane, each pair of struts comprising two members each tapering toward its opposite ends and being of stream line cross-section and a common fitting for connection to the wheel axle at the reduced lower ends of each pair formed integrally therewith.

4. Running gear for airplanes embodying a pair of struts at opposite sides of the chassis of an aeroplane, each pair of struts comprising two members each tapering toward its opposite ends and being of stream line cross-section and each pair having common fittings for connection to the wheel axle at one end and integral fittings for connection to the chassis at the opposite end thereof.

In witness whereof, we hereunto subscribe our names, as attested by the two subscribing witnesses.

JOHN W. RAPP.
JOSEPH VANORIO.

Witnesses:
W. C. LANGE,
JOSEPH F. O'BRIEN.